United States Patent [19]

Lewis

[11] Patent Number: 4,482,793
[45] Date of Patent: Nov. 13, 1984

[54] APPARATUS FOR SIMULTANEOUSLY HEATING A PLURALITY OF ELONGATED WORKPIECES

[75] Inventor: John C. Lewis, Dundas, Canada

[73] Assignee: Park-Ohio Industries, Inc., Shaker Heights, Ohio

[21] Appl. No.: 358,446

[22] Filed: Mar. 15, 1982

[51] Int. Cl.³ .............................................. H05B 9/06
[52] U.S. Cl. .............................. 219/10.71; 219/10.77; 219/10.43
[58] Field of Search ............... 219/10.41, 10.43, 10.49, 219/10.57, 10.69, 10.67, 10.71, 10.75, 10.79, 10.73; 148/146, 150, 154

[56] References Cited

U.S. PATENT DOCUMENTS

| | | | |
|---|---|---|---|
| 1,690,612 | 11/1928 | Anderson . | |
| 1,764,068 | 6/1930 | Crook . | |
| 2,281,850 | 5/1942 | McKinney | 255/28 |
| 2,490,104 | 12/1949 | Strickland | 219/13 |
| 3,489,620 | 1/1970 | Current | 148/146 |
| 3,743,808 | 7/1973 | Kasper | 219/10.77 |
| 3,784,780 | 1/1974 | Laughlin et al. | 219/10.43 |
| 4,093,839 | 6/1978 | Moliterno et al. | 219/8.5 |
| 4,289,944 | 9/1981 | Reese | 219/10.41 |
| 4,418,259 | 11/1983 | Lewis | 219/10.43 |
| 4,420,667 | 12/1983 | Lewis | 219/10.41 |
| 4,433,226 | 2/1984 | Wagar | 219/10.41 |

FOREIGN PATENT DOCUMENTS

| | | |
|---|---|---|
| 1508430 | 10/1969 | Fed. Rep. of Germany . |
| 1533955 | 2/1970 | Fed. Rep. of Germany . |
| 2801661 | 8/1979 | Fed. Rep. of Germany . |
| 815003 | 6/1937 | France . |
| 1557249 | 1/1969 | France . |
| 2360674 | 8/1977 | France . |

Primary Examiner—C. L. Albritton
Assistant Examiner—M. M. Lateef
Attorney, Agent, or Firm—Body, Vickers & Daniels

[57] ABSTRACT

A device for inductively heating simultaneously and alike a plurality of identical elongated workpieces each having at least two axially spaced portions, to produce identical predetermined heat profiles in the workpiece throughout their longitudinal extents. The workpieces are conveyed at a predetermined uniform speed along work paths extending in a linear direction. A plurality of like multi-turn induction heating coils are coaxially disposed along the work paths and connected to a two-level power source. A reciprocal stop aligns the leading ends of the workpieces along the feed paths relative to the heating coils. The coils are at a first level of energization adapted to inductively heat the first axial portion of the respective workpieces identically to the same predetermined temperature as they pass through the coils. After a predetermined time interval during the heating cycle, triggered by the action of the stop, the coils are automatically placed at the other level of energization to inductively heat the second axial portion of the respective workpieces identically.

23 Claims, 12 Drawing Figures

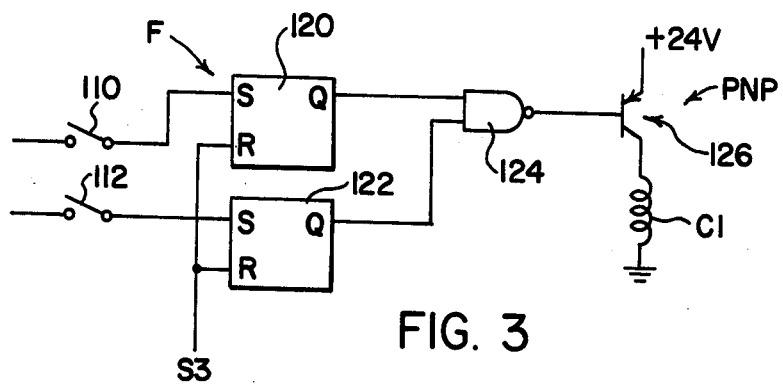
FIG. 3
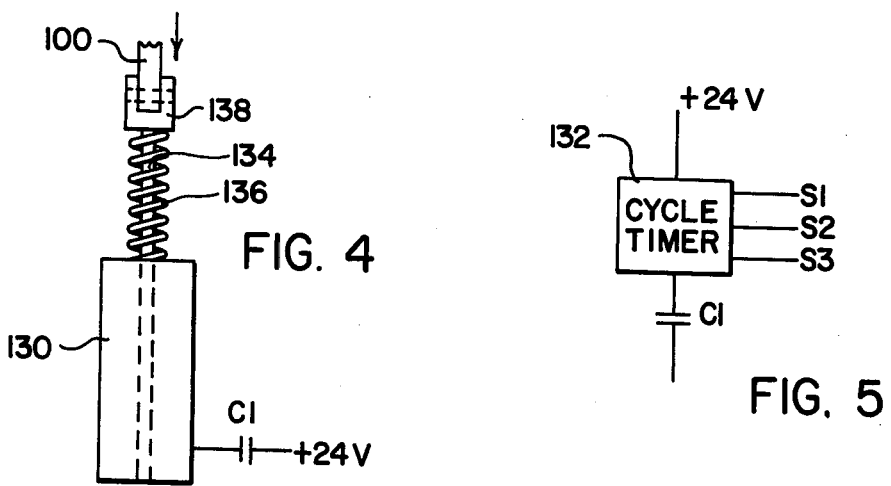
FIG. 4
FIG. 5
FIG. 6
| INT | S1 | S2 | S3 |
|---|---|---|---|
| 1 | 0 | 0 | 0 |
| 2 | 1 | 0 | 0 |
| 3 | 0 | 1 | 0 |
| 4 | 1 | 0 | 0 |
| 5 | 0 | 0 | 1 |

APPARATUS FOR SIMULTANEOUSLY HEATING A PLURALITY OF ELONGATED WORKPIECES

BACKGROUND

This invention relates to the art of induction heating and, more particularly, to an apparatus for inductively heating simultaneously a plurality of identical elongated workpieces respectively having a plurality of axial spaced portions of different cross-sectional area each of which is to be subjected to different heating levels and wherein each workpiece is to be heated to have the same heat profile extending along the length thereof.

The invention is particularly applicable to the heating of sucker rods which are employed in oil wells and the like and will be described in particular reference thereto. It will be appreciated, however, that the invention has broader application and may be used for inductively heating simultaneously and alike a plurality of identical bars having a uniform cross-sectional area throughout their length wherein the heat profile extending along the surface of the bar is to be uneven, i.e., the surface at one end of the bar is to be hotter than the other end.

Sucker rods are utilized in the petroleum industry as a connecting link between a down hole oil well pump and the lifting or pumping device on the surface. The rods are of generally cylindrical form and are quite long, normally being on the order of magnitude of 25 to 30 feet. A major portion of the rod has a uniform cross-section with an enlargement being included adjacent each end thereof. These enlargements facilitate interconnecting a plurality of the rods in an end-to-end relationship with each other. While there are a number of specific or detailed modifications which may be included in the sucker rod configurations of different manufacturers, almost all such rods have the foregoing general configuration and characteristics.

As one of the manufacturing steps, the sucker rods are heated identically to a given predetermined temperature and then passed through an electrostatic spray chamber for application of a coating of paint or plastic-like material thereto. Since the rods need only be surface heated for this purpose, induction type heating finds particular use in this environment. Also, it is generally desirable for economic reasons to heat more than one sucker rod at a time. This can be done by passing the several sucker rods simultaneously through sets of like inductor coils connected in series or in parallel to a suitable power supply, each set comprising a separate induction heating coil for each workpiece. With this type of heating arrangement however, it is essential that each individual workpiece enter its respective coil simultaneously. This is due to the fact that the circuit conditions must be changed during the progress of the sucker rod through the coil because of the diameter variations along the length of the rod. These mass variations in the rods require that the circuit conditions in the coils vary, as a sucker rod is passed through the coil, to insure uniform surface heating of the workpiece.

BRIEF SUMMARY OF THE INVENTION

The present invention provides an apparatus for inductively heating simultaneously a plurality of identical elongated workpieces, each workpiece having a plurality of axial spaced portions of different cross-sectional area each of which is to be subjected to different heating levels, and wherein each workpiece is to be identically heated to have the same heat profile extending along the length thereof.

In accordance with one aspect of the invention there is provided, in combination with workpiece feeding means for conveying the plurality of workpieces at the same constant rate of speed longitudinally along respective similar work paths leading to and through respective heating coils of an inductor adapted to be energized to different heating levels, a workpiece position adjusting means for locating the leading ends of the workpieces at the same pre-entry distance from the entrance end of their respective heating coils in order to assure their passage therethrough in the same timed and positional relation thereto.

According to a further aspect of the invention, the power supply for the inductor of a workpiece feeding and heating means such as described above is provided with control means for effecting identical energizing of the respective heating coils to selected different heating levels depending on the relative position of the advancing workpieces with respect to their respective heating coils.

The principal object of the present invention is to provide a method and apparatus for inductively heating simultaneously and identically a plurality of identical elongated workpieces each having a corresponding plurality of axial spaced portions which are subjected to different heat levels to produce the same heat profile in each workpiece throughout the longitudinal extent thereof.

Another object of the invention is to provide an inductive heating method and apparatus of the above described type for identically heating a plurality of identical workpieces having a corresponding plurality of axial spaced portions of different cross-sectional area.

Another object of the present invention is the provision of such method and apparatus for use in uniformly heating a plurality of like sucker rods prior to performing manufacturing operations thereon.

Another object of the present invention is to provide a method and apparatus for simultaneously heating a plurality of identical bars having a uniform cross-sectional area throughout the length thereof wherein each bar is to be heated to have the same heat profile, which heat profile varies along the length of each bar.

These and other objects and advantages of the invention will become apparent from the following description of species thereof taken together with the accompanying drawings.

BRIEF DESCRIPTION OF THE DRAWINGS

In the Drawings:

FIG. 3 is a schematic diagram of the logic system controlling the gate mechanism of the apparatus shown in FIGS. 1 and 2;

FIG. 4 is a schematic top view showing the gate control mechanism of the apparatus shown in FIGS. 1 and 2;

FIG. 5 is a schematic representation of a cycle timer used to control the energization level of the inductive heating mechanism of the apparatus;

FIG. 6 is a chart showing the operating sequence of the cycle timer shown in FIG. 5;

DETAILED DESCRIPTION OF THE PREFERRED EMBODIMENT

Figure 1:
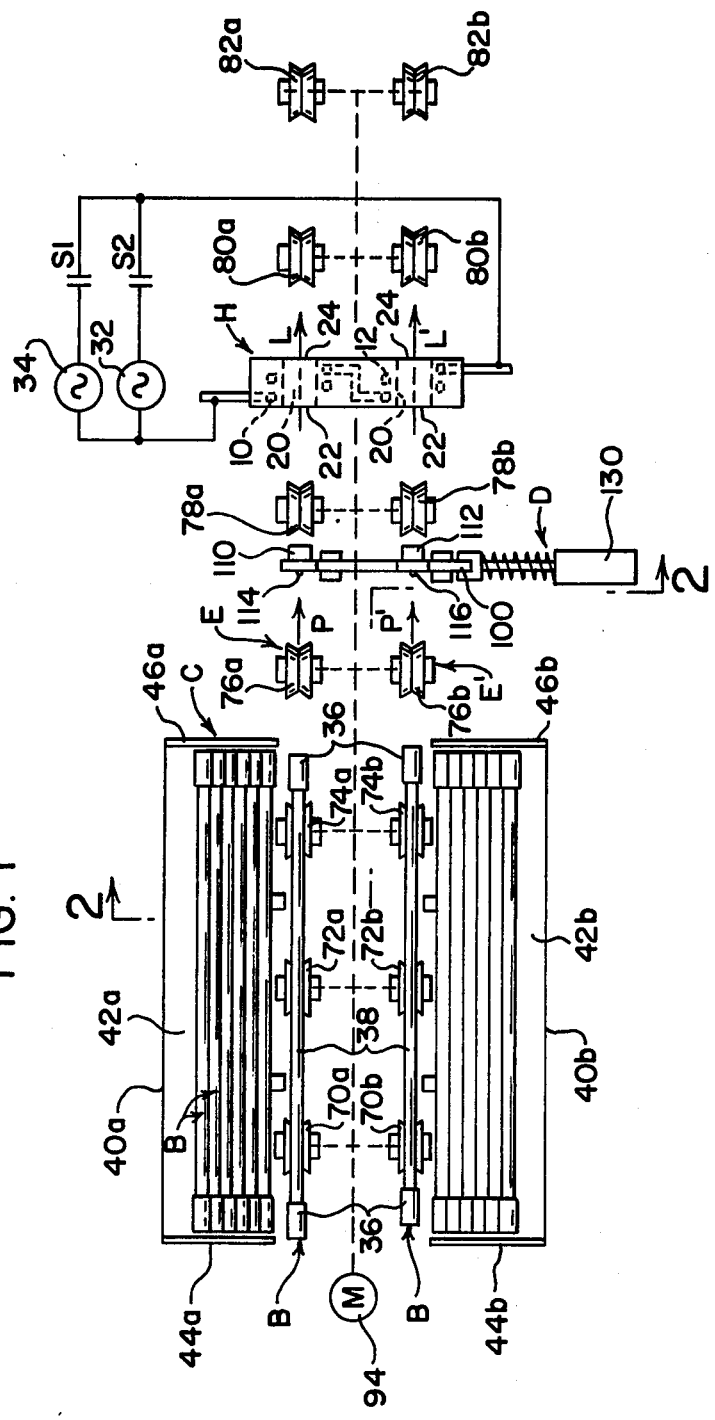
FIG. 1 is a plan view of a preferred embodiment of apparatus comprising the invention for inductively heating elongated metal workpieces.

Referring now to the drawings wherein the showings are for the purpose of illustrating the preferred embodiment of the invention only and not for the purpose of limiting same, the apparatus comprising the present invention, illustrated in FIG. 1 and shown in more detail in FIGS. 2, 7A, 7B, 7C and 7D, is used for inductively heating elongated workpieces such as sucker rods, designated B in FIG. 1, for oil well installations. The apparatus includes a heating device H best shown in FIGS. 7A through 7D; a storage device C for a supply of the workpieces or sucker rods B; a workpiece aligning device D best shown in FIG. 2; and a conveyor device E best shown in FIG. 1. The system is arranged in a linear pattern so that the sucker rods B travel in a generally straight line.

Referring now more particularly to the induction heating device H of the apparatus comprising the invention, this heating device includes a plurality of multi-turn induction heating coils each formed from a hollow electrical conductor helically coiled about a linear coil axis, the coils being mounted side-by-side with their axis extending in parallel relationship in a linear direction L. The preferred embodiment employs two coils 10 and 12, but it should be appreciated that more than two coils, for simultaneously heating more than two workpieces B, could be used without deviating from the basic invention. Since both coils 10 and 12 are substantially the same, only one coil will be described in detail.

The multi-turn induction heating coils 10, 12 each include a central workpiece-receiving passage 20 (FIG. 7A) which has its axis coinciding with the axis of the respective coil, and which is generally cylindrical and has an interior diameter slightly larger than the external diameter of the sucker rods or other workpieces B to be fed therethrough. Each coil includes an entrant end 22 and an exit end 24 and is embedded in a ceramic material 25 in accordance with standard induction heating practice. The coils 10, 12 are adapted to be alternately connected in series to a high frequency power source 32 (FIG. 1) and a low frequency power source 34, controlled by switches S1 and S2 respectively, to effect the heating of different axial sections 36 and 38 of the sucker rods B, i.e., the large diameter end sections 36 thereof and the smaller diameter intermediate sections 38 extending between the end sections 36. Because the surfaces of the larger diameter end sections 36 are nearest the coils 10, 12 as they pass therethrough, lower power levels, provided by low energy source 34, are required to heat these surfaces to the desired given temperature than are required to heat to the same given temperature the surface of the smaller diameter intermediate sections 38 which are further away from the coils 10, 12. Intermediate sections 38 thus require the higher power levels provided by the high energy power source 32 as they pass through the coils. The length of time for each high or low heating interval is determined by the mass of the area to be heated, the length of the area to be heated, and the speed of the sucker rod B as it passes through the inductor. The coils 10, 12 in the preferred embodiment are connected in series, but alternatively may be connected in parallel.

Figure 2:
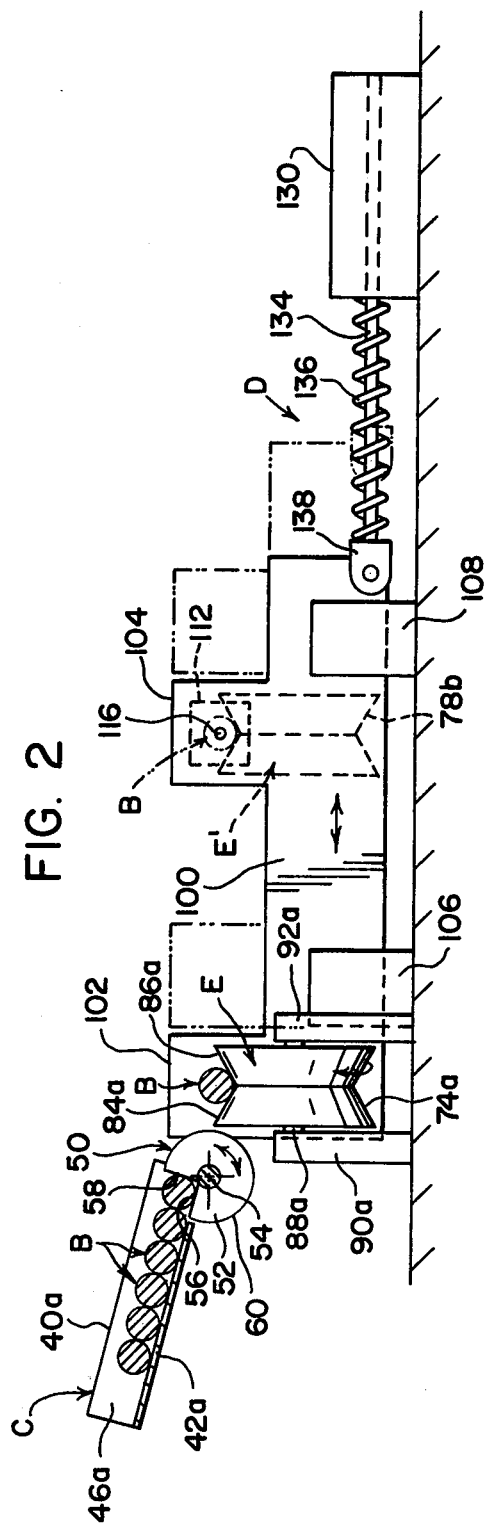
FIG. 2 is an enlarged cross-sectional view taken generally along the lines 2—2 of FIG. 1.

The sucker rods B are initially loaded into and located on storage devices C located opposite one another outwardly of the respective rod conveying paths P and P' as illustrated in FIGS. 1 and 2. The rods rest on racks 40a and 40b of the storage devices C. In the preferred embodiment, two storage devices C are used, one for each coil 10, 12. Both devices C are basically identical with the exception that rack 40a (FIG. 1) of one device feeds the sucker rods thereon laterally one by one to a conveyor E for transporting the individual rods into and through coil 10 while the rack 40b of the other device C feeds the sucker rods thereon laterally one by one to another like conveyor E' for transporting the individual rods into and through the coil 12. Since racks 40a and 40b are alike except for their reversed rod-feeding arrangement, a description of one (i.e., rack 40a) will apply equally to both racks. Rack 40a is comprised of a flat ramp member 42a on which the bars B rest and provided along its opposite inclined edges with upstanding lips or ways 44a and 46a spaced apart a distance slightly greater than the length of the sucker rods B to define a guideway therefor down which the cylindrical rods roll or drop by gravity for transfer into the conveyor E. The sucker rods are placed on the rack 40a and rest in axially parallel relationship on the inclined ramp member 42a. Side members 44a and 46a confine the rods B lengthwise within the rack guideway.

To transfer the sucker rods B from racks 40a and 40b of their respective conveyor devices E and E', each rod storage and feed rack 40a, 40b is provided with a rod transfer mechanism 50 of similar type, only one of which is shown in FIG. 2. Each transfer device 50 comprises a circular plate 52 mounted on a shaft 54 which extends parallel to the sucker rods in the respective racks 40a, 40b as well as parallel to the paths P, P' in which the rods B are transported by the conveyors E and E'. Plate member 52 of each transfer device 50 is formed with a V-notch in its periphery to provide two surfaces 56 and 58 which lie in planes generally perpendicular to one another to accommodate one of the sucker rods B therebetween. At the start of its rod transfer operation, the surface 56 of transfer plates 52 constitute an extension of inclined ramp members 42a, 42b of the racks 40a, 40b, while surface 58 acts as a limiting stop to trap the lowermost one of the downwardly rolling rods B on racks 40a, 40b within the V-notch 56, 58 of the transfer plates. Surface 56 is of a length more or less corresponding to the length of the sucker rods B so that they will rest thereon throughout substantially their entire length. Plates 52 are arranged to be oppositely rotated in clockwise and counter clockwise directions along with shaft 54 by suitable intermittently operated power drive means (not shown) which, in the particular embodiment of the invention illustrated, is designed to operate both of the transfer mechanisms 50 for the sucker rods in the respective storage devices C in timed synchronism with one another. As transfer plate 52 for rack 40a is rotated clockwise in FIG. 2, surface 56 captures the lowermost one of the sucker rods on rack 40a as it rolls down into the notch 56, 58 of the plate 52. At the same time, the transfer plate 52 for the other rack 40b is rotated counter-clockwise to cause its surface 56 to likewise capture the lowermost one of the sucker rods on rack 40b as it rolls down into the notch 56, 58 of the plate 52. The outer circumferential surfaces 60 of plates 52 act as a stop to prevent the remaining sucker rods on the respective racks 40a, 40b from rolling down the inclined surfaces 42a, 42b thereof as the plates 52 transfer the captured sucker rods from racks 40a, 40b to conveyor devices E, E'.

To convey the transferred sucker rods B toward and through the inductor coils 10 and 12, the conveyor devices E, E' for the respective rod-feeding devices C are provided with a series of power driven V-groove feed rolls 70a, 72a . . . 82a and 70b, 72b . . . 80b, respectively, within the V-grooves of which the rods B rest and are driven forwardly or transported by gravity induced friction forces such as act to yieldingly feed the rods B ahead. Rolls 70a through 82a are aligned to define a rod-feeding path P extending in a linear direction L through coil 10 for the rods from feed rack 40a, while rolls 70b to 82b are aligned to define a parallel rod-feeding path P' through coil 12 for the rods B from feed rack 40b. Since all the conveyor rolls are substantially the same, only one roll (74a) will be described in detail. Feed roll 74a, best shown in FIG. 2, has two inwardly converging peripheral surfaces 84a and 86a forming a V-shaped groove around the circumference of the roll. The roll is mounted for axial rotation on fixed support blocks 90a and 92a by pivot pin 88a. The feed rolls in each set are aligned to provide a straight path P or P' through the respective inductor coils 10 or 12. In the preferred embodiment, feed rolls 70a through 78a are situated in advance of coil 10 while rolls 80a and 82a are situated at the exit ends of this coil. The corresponding feed rolls 70b–78b, and 80b–82b, of the other set are similarly located relative to coil 12. Both sets of feed rolls are simultaneously driven by appropriate motor drive means 94 to rotate them at the same uniform rotational speed in the appropriate direction to transport the sucker rods B into and through the respective coils 10, 12. The mechanical means for driving the feed rolls is not shown but may be any one of a number of known means for such purpose.

Although the transfer devices 50 for transferring the sucker rods B from the two storage devices C onto the feed rolls of their respective conveyor devices E, E' are, as previously stated, designed to operate in timed synchronism with one another during each rod transfer cycle thereof, nevertheless the two sucker rods B thus transferred by the two synchronized transfer devices are not, for some reason or other, always deposited within and engaged with the V-grooves 84a, 86a of the feed rolls 70a, 72a, 74a and 70b, 72b, 74b of their respective conveyor devices E, E' at the same exact time. This may be due, for example, to possible different surface characteristcis (scale, etc.) on the two sucker rods B being transferred such as might cause a difference in the rate of their gravitational rolling discharge movement out of the V-notches 56, 58 of their respective transfer plates 52 and into the V-grooves 84a, 86a of the feed rolls. For this and other possible reasons, the two sucker rods B transferred onto the feed rolls of the conveyor devices E, E' during each operating cycle of the rod transfer mechanisms 50 are not always transported along their respective rod-feeding paths P and P' and through their respective heating coils 10, 12 in the same exact longitudinal positional relationship thereto, e.g., in exact laterally aligned side-by-side position in the case of the particular embodiment of the invention shown in FIGS. 1 and 2. In other words, one of the two advancing sucker rods B might possibly be ahead of the other. When this condition exists, the two sucker rods B then are not heated identically throughout their longitudinal extent by the identically operating heating coils 10, 12.

To prevent the above described condition from occurring, a workpiece position readjusting or aligning device D is provided in accordance with the invention. As best shown in FIG. 2, the aligning device D comprises an elongated plate or gate member 100 located between the sucker rod storage devices C and the inductor heating device H of the apparatus and extending transversely of and below the feed paths P, P' of the sucker rods. The plate member 100 is provided with a pair of upstanding stop arm portions 102, 104 spaced apart therealong, on centers, a distance corresponding to the lateral spacing between the two feed paths P, P' of the sucker rods and located at the elevational level thereof. The plate or gate member 100 is supported and guided in fixed guide support blocks 106, 108 for reciprocating movement transversely of the feed paths P, P' between an operative position (as shown in solid lines in FIG. 2) in which the stop arms 102, 104 momentarily block the feed paths P, P' and an inoperative position (as shown in dash-dot lines in FIG. 2) in which the stop arms 102, 104 are clear of these feed paths. In its operative position, the plate or gate member 100 momentarily blocks the continued feed movement of the one of the sucker rods B that may be advancing ahead of the other until such time as the lagging sucker rod catches up and the two sucker rods become laterally aligned with one another so that their leading ends are located the same pre-entry distance from their respective heating coils 10, 12. This blocking of the feed movement of the leading sucker rod B, even though the feed rolls on which it rests and is driven continues to rotate in their rod-transporting direction, is of course possible owing to the yielding feed of the sucker rods by the rotating feed rolls on which the sucker rods rest and are driven forwardly merely by the gravitational friction force present therebetween. As soon as the two sucker rods B become thus laterally aligned at the same pre-entry distance from the heating coils 10, 12, the plate or gate member 100 is retracted to its inoperative position so as to shift the stop arms 102, 104 to a location clear of the feed paths P, P' and out of the way of the sucker rods on the feed rolls to then permit feed movement of both sucker rods B to start once again by the feed rolls. However, due to the aligning action of the gate 100, the rods B now move in an exact laterally aligned position with one another so that they simultaneously enter and pass through their respective heating coils 10, 12 in the same exact timed longitudinal relation and thus are identically heated throughout their longitudinal extents.

The retraction of the plate or gate member 100 is controlled by a pair of momentary electrical contact type switches 110 and 112 which are mounted on the plate member 100 with their operating arms or plungers 114, 116 aligned with respective ones of the feed paths P, P' of the sucker rods B, for contacting the leading ends of the advancing sucker rods. Electrical contact plungers 114 and 116 of contact switches 110, 112 extend through apertures in the plate arm portions 102 and 104 in a direction toward the oncoming sucker rods B so as to activate the switches when contacted by the leading ends of the oncoming sucker rods. The position of gate 100 is controlled by a solenoid 130 which in turn is controlled by the circuit F shown in FIG. 3. The circuit F comprises a pair of flip-flops 120 and 122, a NAND gate 124, and transistor 126 which activates the coil C1 of solenoid 130 and is connected to a +24 volt power supply, as shown. Contact C1 corresponding to coil C1 activates solenoid 130 and a cycle timer 132 (FIG. 5). Solenoid 130 is fastened to plate or gate member 100 by means of the solenoid armature rod 134 and clevis 138. Gate 100 is normally biased to its operative or sucker rod obstructing position as shown in FIG. 2 by means of bias spring 136. Cycle timer 132 controls contact switches S1, S2 and S3 (FIG. 5). Contacts S1 and S2 control power sources 32 and 34 as seen in FIG. 1 and switch S3 is connected to reset portions of flip flops 120 and 122 as shown in FIG. 3. Operation of the cycle timer 132 will be described in more detail hereinafter.

In operation, a plurality of sucker rods B are placed in axial parallel relationship on racks 40a and 40b of the storage devices C. Since both of the racks 40a, 40b and their respective conveyors E, E' operate substantially in the same manner, only the operation of rack 40a will be described. Inclined surface 42a of rack 40a causes the sucker rods therein to move downwardly to locate the lowermost one against surface 58 of transfer element 52. Transfer element 52 is rotated clock-wise as viewed in FIG. 2, by shaft 54, and the lowermost one of the sucker rods is captured by surface 56 of element 52. As this element 52 continues to rotate, surface 60 thereof prevents further movement of the remaining sucker rods on rack 40a down incline surface 42a of the rack. The captured sucker rod is deposited on feed rolls 70a, 72a and 74a of conveyor device E. In a like manner, a sucker rod from rack 40b is deposited approximately at the same time on rolls 70b, 72b and 74b of conveyor device E' by the transfer mechanism 50 for such rack 50b.

Figure 7A:
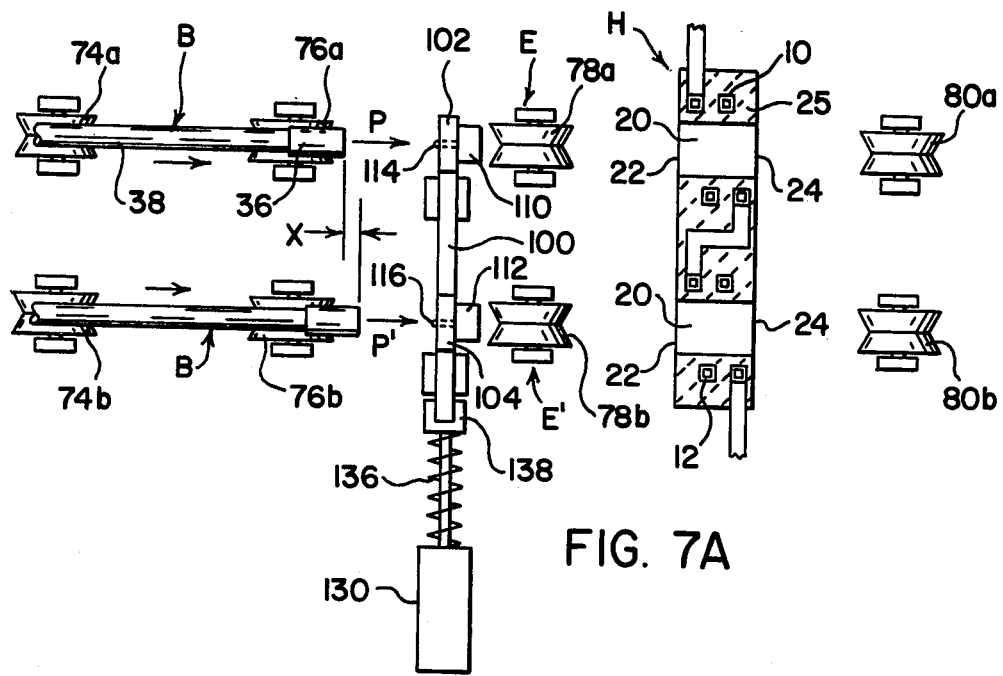
FIGS. 7A, 7B, 7C and 7D are plan views showing the gate mechanism of the apparatus of FIGS. 1 and 2 in successive operating positions thereof during the course of a workpiece feeding and heating cycle.
Figure 7B:
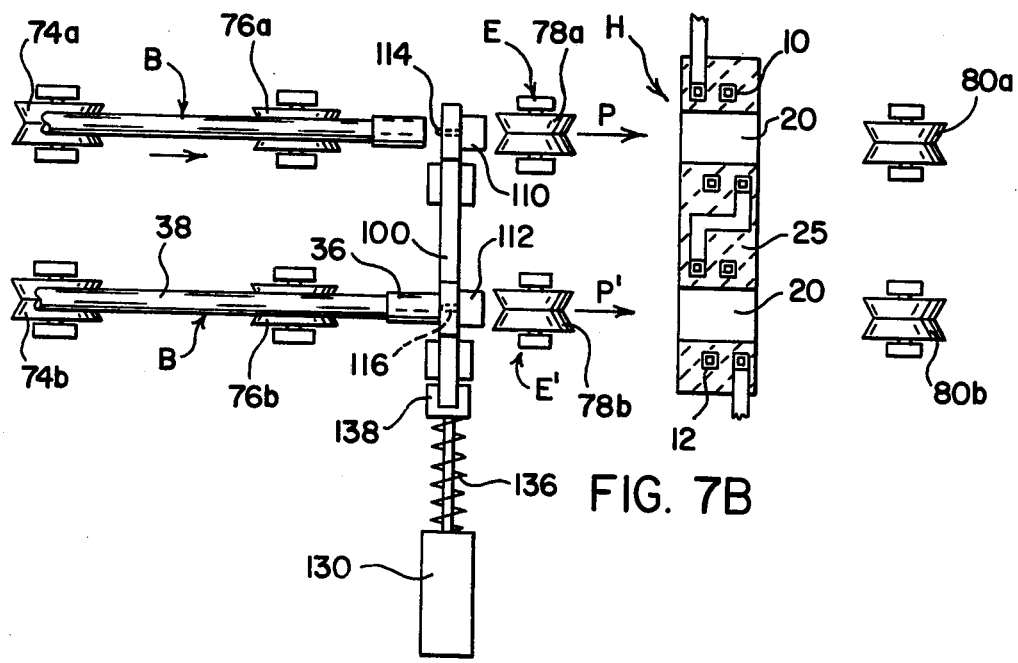
Figure 7C:
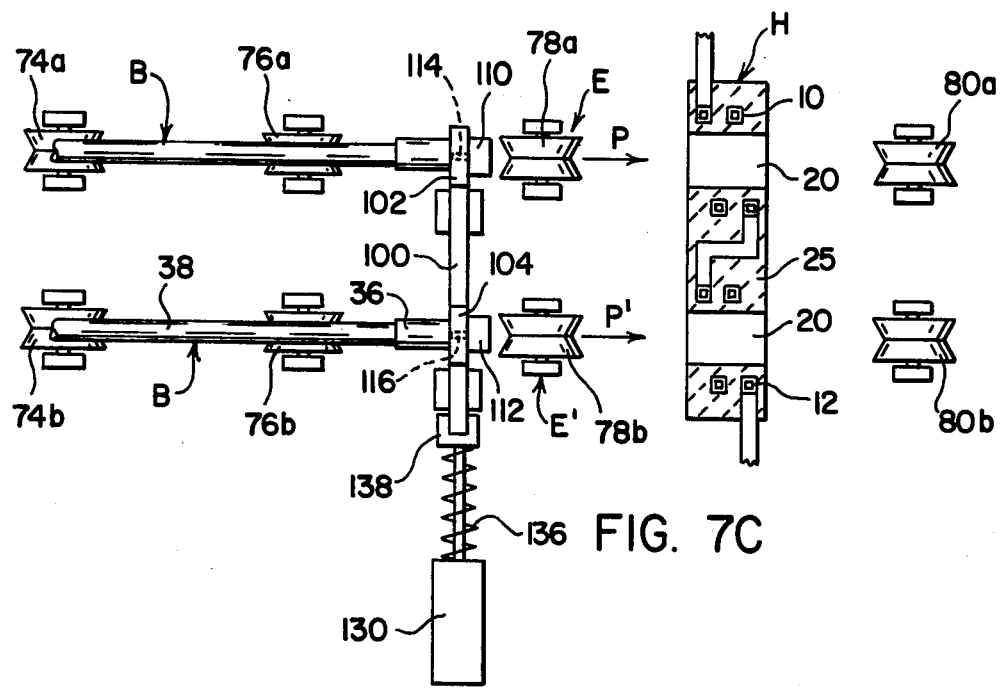
Figure 7D:
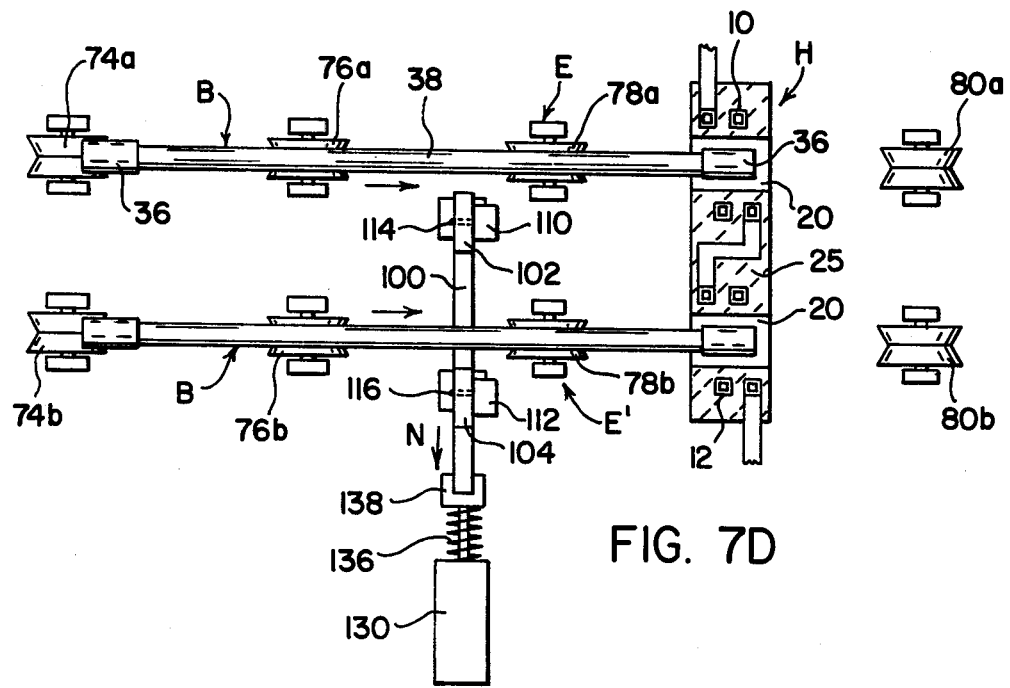

In some situations, as described previously, the sucker rods or workpieces transferred into the respective conveyor devices E, E' may not be deposited in the same relative longitudinal position therein. FIG. 7A shows a situation where one sucker rod B is further advanced along the respective heating path P' by a distance X. As shown in FIG. 7A, plate or gate member 100 is biased by spring 136 to its operative position in which the plate arm portions 102 and 104 thereof are in obstructing relationship with the workpiece paths. Since feed rolls 70a to 82a and 70b to 82b are simultaneously driven at uniform speed by motor 94, the misaligned rods B on conveyors E, E' then advance along the respective paths P, P' in such misaligned relation at equivalent rates until the foremost rod (in this case the rod on rolls 72b to 76b) meets contact switch arm 116 of switch 112 mounted on plate arm portion 104, as shown in FIG. 7B. Switch 112 is thus momentarily closed and sets flip-flop 122 which then establishes a high level on the output line Q thereof, as seen in FIG. 3. Also, plate arm 104 prevents further advancement of the leading sucker rod B along the path P'. The other or lagging rod B being transported along path P, however, continues its advance toward gate 100 until it meets switch contact arm 114 of switch 110 to close the same, and abuts against the plate arm 102, as shown in FIG. 7C. Both sucker rods B are now located in the same exact longitudinal position along their respective paths P, P', with their leading ends located at the same preentry distance from the entrance ends of the inductor coils 10, 12. The momentarily closed switch 110 sets flip-flop 120, establishing a high output level. NAND gate 124 has a low level which activates transistor 126, energizing coil C1. Coil C1 closes its related contact C1 which then energizes solenoid 130, shifting gate 100 in a retractive direction N to its operative, non-obstructive position as shown in FIG. 7D. The sucker rods B are then cleared to proceed in unison and in exact laterally aligned relation toward inductor coils 10 and 12. At the same moment, the closed contact G1 activates cycle timer 132.

Timer 132 is programmed to close switches S1 and S2 and S3 at predetermined time intervals following closure of the contact C1, as shown in the table of FIG. 6. The duration of each time period is established by the speed of the sucker rods B along paths P, P', the distance of the gate 100 from the entrance end 22 of coils 10 and 12, and the respective lengths of the larger diameter end sections 36 and smaller diameter intermediate sections 38 of the sucker rods. As indicated in FIG. 6, during the initial time interval, none of the switches S1, S2 and S3 are closed by the timer. This initial time interval corresponds to the time it takes for the sucker rods B to travel from their gated position in engagement with gate 100, to the entrance ends 22 of the inductor coils 10, 12. During time interval 2, switch S1 is closed by the timer to connect coils 10 and 12 to low energization source 34. This time interval 2 corresponds to the time period when the relatively large mass of the forward ends 36 of the sucker rods are passing through the inductor coils 10, 12. During time interval 3, switch S1 is opened and switch S2 closed by the timer to then connect coils 10 and 12 to high energization source 32. This time interval 3 corresponds to the time it takes for the small diameter mass or intermediate sections 38 of the sucker rods between the larger diameter ends 36 thereof to pass through the inductor coils. During time interval 4, switch S2 is opened and switch S1 is again closed to reconnect the coils 10, 12 once again to low energy source 34 to heat the large mass at the trailing ends 36 of the sucker rods. It will be appreciated that a small amount of jouncing of the sucker rods B will occur as the large masses at each end 36 thereof move over the respective feed rolls. However, due to the extended lengths of the sucker rods B, the positioning of the coils 10, 12 between the feed rolls 78a, 80a and 78b, 80A, and the diameter of the coil passageways 20, such jouncing of the sucker rods does not materially affect the operation of the apparatus comprising the present invention. During time interval 5, switch S3 is closed to in turn reset flip-flop 120 and 122, thus establishing a low output on lines Q to NAND gate 124. As a result, this NAND gate has a high level output which in turn reactivates transistor 126, thereby deactivating coil C1. Coil C1 in turn opens the related contact C1 which then de-energizes solenoid 130, enabling spring 136 to reposition gate 100 once again in its operative or obstructing position. In addition, cycle timer 132 is reset. It should be appreciated that means other than circuit F are available to control the movement of gate 100. Microprocessor systems or other digital control systems could be used without deviating from the basic invention.

Figure 8:
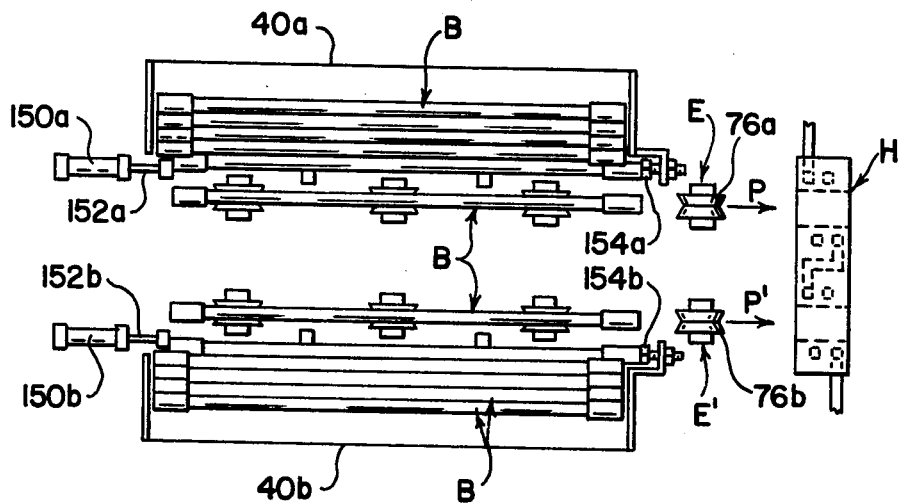
FIGS. 8 and 9 are plan views of modified forms of the workpiece feeding mechanism comprising the invention.
Figure 9:
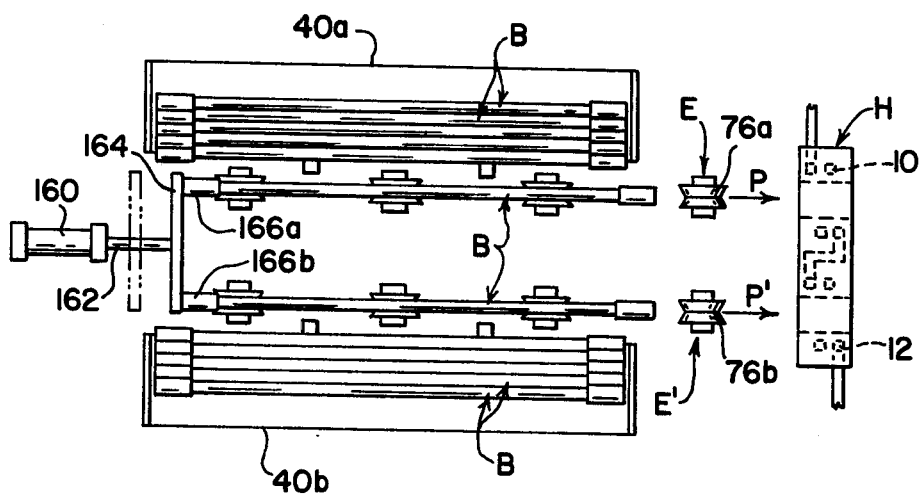

The invention has been described hereinabove with reference to a preferred embodiment of the invention. However, other embodiments such as shown in FIGS. 8 and 9 may be employed as well. In FIG. 8, solenoids 150a and 150b are located to the rear of racks 40a and 40b, with their armature rods 152a and 152b facing and respectively aligned with the lowermost ones of the sucker rods which rest in the racks 40a, 40b against the circumferential surface 60 of the respective transfer plates 52. The solenoids 150 are employed to laterally align the lowermost one of the sucker rods in each rack 40a, 40b with one another by forcing them forwardly against adjustable abutment stops 154a and 154b mounted on the racks. The solenoids 150a, 150b are activated from a suitable power supply (not shown) in timed relation to the synchronized operation of the rod transfer mechanisms 50 so as to effect the lateral aligning of the lowermost ones of the sucker rods B in the racks 40a, 40b while they are still retained in place therein by their resting engagement against the circumferential surface 60 of their respective transfer plates 52.

FIG. 9 discloses another embodiment of the present invention wherein the sucker rods B are readjusted to exact laterally aligned relative position on their respective conveyor devices E, E' as soon as they are transferred thereonto by their respective transfer mechanisms 50. Solenoid 160 located to the rear of racks 40a, 40b has an armature rod 162 extending parallel to and more or less centrally between the two feed paths P, P' of the sucker rods and facing toward the inductor H. A cross member 164 fastened to the outer end of armature rod 162 has two laterally spaced push rod members 166a, 166b which extend forwardly in alignment with the respective workpiece feed paths P, P'. When solenoid armature rod 162 is extended, push rod members 166a, 166b abut against the rear ends of the sucker rods B, immediately upon transfer onto the conveyor devices E, E' to push them forwardly thereon a sufficient distance to effect the exact lateral aligning of the two sucker rods, if not previously so aligned. The solenoid 160 is operated in timed relation to the operation of the sucker rod transfer mechanism 50 so as to effect the forward pushing ahead of the transferred sucker rods on the conveyor devices E, E' into exact laterally aligned relative position thereon immediately upon their transfer to and resting engagement on the feed rolls of the conveyor devices.

In addition to uniformly heating the surface of elongated workpieces B having axial portions of varying diameters, it will be appreciated that the present invention also may be employed to heat metal rods of uniform diameter throughout to varying surface temperatures throughout their axial extent. Additional modifications and alterations will occur to others upon the reading and understanding of this specification. It is my intention to include all such modifications and alterations insofar as they come within the scope of the appended claims or the equivalents thereof.

Having thus defined the invention, the following is claimed:

1. An apparatus for simultaneously inductively heating a plurality of identical elongated workpieces to a generally similar temperature over the length thereof, said workpieces having a substantially uniform cross-section over a first portion of the workpiece length and a second portion with a cross-section greater than said first portion, said apparatus comprising:

means for conveying said workpieces at the same predetermined uniform rate of speed generally longitudinally along a plurality of similar work paths, an inductor heating unit having at least two energization levels and having a plurality of identical elongated heating zones, said zones being interconnected to effect simultaneous energization, and each having an entrance end and an exit end and being coaxially disposed about a respective one of said work paths, adjusting means for positioning the leading ends of all said workpieces to a same predetermined position longitudinally of the respective paths of said workpieces and preceding the entrance end of said heating zones, means for sensing when the leading ends of all said workpieces are at said predetermined position, and means initiated by said sensing means for activating said inductor heating means to the first of said two energization levels for a first predetermined time interval when said first portions of said workpieces are conveyed through their respective said heating zones and activating said heating means to the second of said two heat levels for a second predetermined time interval when said second portions of said workpieces are conveyed through said zones.

2. The apparatus defined in claim 1 wherein said position adjusting means comprises means located at said predetermined position along said workpiece paths for temporarily obstructing the movement of said workpieces along said path.

3. The apparatus defined in claim 2 wherein said paths are parallel and extend in the same generally linear direction.

4. The apparatus defined in claim 3 wherein said obstructing means comprises a generally flat plate extending generally transverse to said work paths and having: an obstructing first position wherein said plate obstructs the movement of said workpieces along said paths; and a non-obstructing second position; said plate being reciprocally movable between said first and second positions.

5. The apparatus defined in claim 4 wherein the movement of said plate from said obstructing position to said non-obstructing position is controlled by said sensing means.

6. The apparatus defined in claim 5 wherein said sensing means comprise a plurality of electrical contact switches mounted on said plate and having operating arms disposed in respective ones of said workpiece paths for engagement by the said leading ends of said workpieces to activate said switches.

7. The apparatus defined in claim 5 wherein said heating zones comprise inductor coils adapted to be selectively connected by electrical circuit means to at least first and second independent power sources.

8. The apparatus defined in claim 7 wherein said activating means comprises a cycle timing switch having predetermined time intervals for activating said heating means to said first and second energization levels.

9. The apparatus defined in claim 7 wherein said activating means is initiated by said sensing means.

10. The apparatus defined in claim 5 wherein said conveyor means comprises a plurality of sets of V-notched rolls on which the respective workpieces rest, the rolls of each set being aligned in said linear direction to form said paths and being driven by common motive power means at a predetermined speed to move said work in said linear direction by the frictional contact between said rolls and said workpieces.

11. A method for inductively heating simultaneously a plurality of identical elongated workpieces having at least two axially spaced portions each of which is to be heated differently, said workpieces to be heated to have the same heat profile extending along the length thereof, said method comprising the steps of:
  (a) providing a plurality of parallel elongated workpiece paths extending in the same general linear direction;
  (b) providing a plurality of multi-turn inductors, each having an entrance end and an exit end and being generally coaxially disposed about a portion of a respective one of said workpaths;
  (c) feeding workpieces longitudinally along each work path at a predetermined constant rate of travel toward and through said inductors from said entrance end;
  (d) adjusting the position of the leading ends of said workpieces along their said paths to a predetermined position relative to said entrance end of said inductors as said workpieces approach said inductor entrance end during the said feeding thereof; and,
  (e) simultaneously energizing said inductors to a preselected first energization level at least during said feeding step for inductively heating one of said at least two axial portions to generally a preselected temperature as said workpieces pass through said inductors, and then energizing said inductors to a predetermined second heating level different from said first heating level at a predetermined time during said feeding step for inductively heating the other of said at least two axial portions to generally said preselected temperature as said workpieces pass through said inductors.

12. An apparatus for inductively heating simultaneously a plurality of identical elongated workpieces having at least two axially spaced portions each of which is to be heated differently, said workpieces to be heated to have the same heat profile extending along the length thereof, said apparatus comprising;
  means for conveying said workpieces at the same predetermined uniform rate of speed generally longitudinally along a plurality of similar work paths,
  an induction heating unit having at least two energization levels and a plurality of identical elongated heating zones, said zones being interconnected to effect simultaneous energization, and each having an entrance end and an exit end and being coaxially disposed about a respective one of said work paths,
  adjusting means for positioning the leading ends of all said workpieces to a same predetermined position longitudinally of the respective paths of said workpieces and preceding the entrance end of said heating zones,
  means for sensing when the leading ends of all said workpieces are at the same predetermined position, and
  means initiated by said sensing means for activating said inductor heating means to the first of said two energization levels for a first predetermined time interval when the first of said at least two axially spaced portions of said workpieces are conveyed through said heating zones and activating said inductor heating means to the second of said two energization levels for a second predetermined time interval when the second of said at least two axially spaced portions of said workpieces are conveyed through said zones.

13. The apparatus defined in claim 12 wherein said paths are parallel and extend in the same generally linear direction, and said position adjusting means comprises means located at said predetermined position along said workpiece paths for temporarily obstructing the movement of said workpieces along said paths.

14. The apparatus defined in claim 13 wherein said obstructing means comprises a generally flat plate extending generally transverse to said work paths and having: an obstructing first position wherein said plate obstructs the movement of said workpieces along said paths; and a non-obstructing second position; said plate being reciprocally movable between said first and second positions.

15. The apparatus defined in claim 12 wherein said means activating said inductor heating means comprises an electrical timing circuit controlled by said sensing means, said electrical timing circuit being operative to activate said first and second energization levels at predetermined time intervals following the determination by said sensing means that all said leading ends of said workpieces are at said predetermined position as said workpieces move along said paths.

16. Apparatus for inductively heating simultaneously a plurality of identical elongated workpieces having axially spaced portions, said workpieces to be heated to have the same heat profile extending along the length thereof, said apparatus comprising a plurality of identical induction heating coils having workpiece receiving axial openings for passage of respective ones of said workpieces longitudinally therethrough, electrical power supply means for simultaneously energizing said coils selectively to different heating levels, means for supporting and yieldingly feeding said workpieces lengthwise at a constant speed in directions toward and through the workpiece receiving openings of respective ones of said heating coils, workpiece position adjusting means engaging said plurality of workpieces during the feeding thereof toward said heating coils to effect the positioning of said workpieces all at the same predetermined longitudinal position from the entrance end of their respective heating coils, and electrical circuit means including timer means actuated in response to the said positioning of said workpieces by said adjusting means to connect the said heating coils to said power supply means to energize simultaneously said coils to the said different heating levels in timed relation to the passage of the said axial spaced portions of the workpieces through the heating coils.

17. The apparatus defined in claim 12 wherein said adjusting means comprises means located at said predetermined position for temporarily obstructing said feeding of said workpieces toward and through the workpiece receiving openings of respective ones of said heating coils.

18. Apparatus for identically and simultaneously inductively heating corresponding axial portions of identical elongated workpieces, said apparatus comprising an inductor including a plurality of identical induction heating coils having workpiece-receiving axial passageways for passage of respective ones of said workpieces longitudinally therethrough,
  electrical power supply means for simultaneously and identically energizing said coils to different selective energization levels,
  means for supporting and yieldingly feeding said workpieces longitudinally at a constant speed in directions toward and axially through the workpiece receiving passageways of respective ones of said heating coils, workpiece position locating means coacting with the said plurality of workpieces, during the said feeding thereof, to determine positioning of the leading ends of the workpieces all at the same given pre-entry distance from the entrance end of their respective heating coil passageways, said workpiece feeding means acting to then feed the so correspondingly positioned workpieces in unison at the said constant speed toward and through their respective heating coil passageways, and electrical circuit means including timer means actuated by said workpiece position locating means, in response to the positioning of all said workpieces with their leading ends at said pre-entry distance, to connect the said heating coils to said power supply means to simultaneously energize said coils each to the said heating levels in timed relation to the passage of the said axial spaced portions of the workpieces through the said heating coil passageways.

19. Apparatus as defined in claim 18 wherein the said workpiece position locating means includes gate means having an operative position for engaging the leading ends of said workpieces, during the feeding movement thereof toward their respective heating coil passageway, to obstruct the feeding movement of said workpieces so as to temporarily position the said leading ends thereof all at the same given pre-entry distance from the entrance end of their respective coil passageway, and means actuated in response to the said positioning of the leading ends of all the workpieces at said given pre-entry distance by said gate means for retracting said gate means to an inoperative position so as to release said workpieces for said continued feeding movement in unison into and through their respective coil passageways by said workpiece feeding means.

20. Apparatus as defined in claim 19 wherein the said workpieces are fed by said feeding means in the same direction along parallel paths into their respective heating coil passageways, and the said gate means comprises a single member mounted for movement between the said operative and inoperative positions.

21. Apparatus as defined in claim 18 wherein the said workpiece position locating means includes sensing means for determining when the leading ends of all said workpieces are located at the said given pre-entry distance from the entrance end of their respective coil passageways.

22. Apparatus as defined in claim 21 wherein the said electrical circuit means is actuated by said sensing means.

23. Apparatus as defined in claim 17 wherein the said means for feeding said workpieces comprises a plurality of rotatable V-grooved feed rolls aligned with respective ones of said heating coils and on which the respective workpieces rest, said feed rolls being rotated at uniform speed to transport the said workpieces toward and through their respective said heating coils.

* * * * *